US010315718B2

(12) United States Patent
Kohl et al.

(10) Patent No.: US 10,315,718 B2
(45) Date of Patent: Jun. 11, 2019

(54) DRINKING BOTTLE FOR BICYCLES

(71) Applicant: Canyon Bicycles GmbH, Koblenz (DE)

(72) Inventors: Wolfgang Kohl, Schwabach (DE); Michael Adomeit, Koblenz (DE); Lukas Schuchnigg, Koblenz (DE)

(73) Assignee: Canyon Bicycles GmbH, Koblenz (DE)

( * ) Notice: Subject to any disclaimer, the term of this patent is extended or adjusted under 35 U.S.C. 154(b) by 60 days.

(21) Appl. No.: 15/200,321

(22) Filed: Jul. 1, 2016

(65) Prior Publication Data

US 2017/0001675 A1 Jan. 5, 2017

(30) Foreign Application Priority Data

Jul. 2, 2015 (DE) .................. 20 2015 004 670 U

(51) Int. Cl.
*B62J 11/00* (2006.01)
*B62K 21/12* (2006.01)
*A45F 3/16* (2006.01)

(52) U.S. Cl.
CPC ............... *B62J 11/00* (2013.01); *A45F 3/16* (2013.01); *B62K 21/12* (2013.01)

(58) Field of Classification Search
CPC ............. B62J 11/00; A45F 3/16; B62K 21/12

USPC ......................................................... 224/414
See application file for complete search history.

(56) References Cited

U.S. PATENT DOCUMENTS

| | | |
|---|---|---|
| 3,920,140 A | 11/1975 | Kiser |
| 4,176,770 A | 12/1979 | Griggs et al. |
| 4,441,638 A | 4/1984 | Shimano |
| 5,301,858 A | 4/1994 | Hollander |
| 5,887,775 A | 3/1999 | Sik |
| 2008/0053266 A1 | 3/2008 | Smolik |
| 2013/0032001 A1 | 2/2013 | Smart |
| 2014/0091121 A1 | 4/2014 | Lombard et al. |
| 2014/0231479 A1 | 8/2014 | Vanzanten |

FOREIGN PATENT DOCUMENTS

| | | |
|---|---|---|
| DE | 102013112665 A1 | 5/2015 |
| EP | 1894824 B1 | 3/2008 |
| FR | 2678231 A1 | 12/1992 |

*Primary Examiner* — Peter N Helvey
(74) *Attorney, Agent, or Firm* — The Webb Law Firm

(57) ABSTRACT

A bicycle drinking bottle is provided, which is particularly suited for time trial bicycles and triathlon bicycles. The bicycle drinking bottle includes a liquid container having two opposing side walls, a rear wall, a front wall, a lid, and a bottom element, with the two side walls including recesses for receiving fixing elements that are connected with a handlebar of a bicycle steering structure. A bicycle steering structure system including a handlebar with such a drinking bottle connected thereto through two fixing elements is also provided.

15 Claims, 4 Drawing Sheets

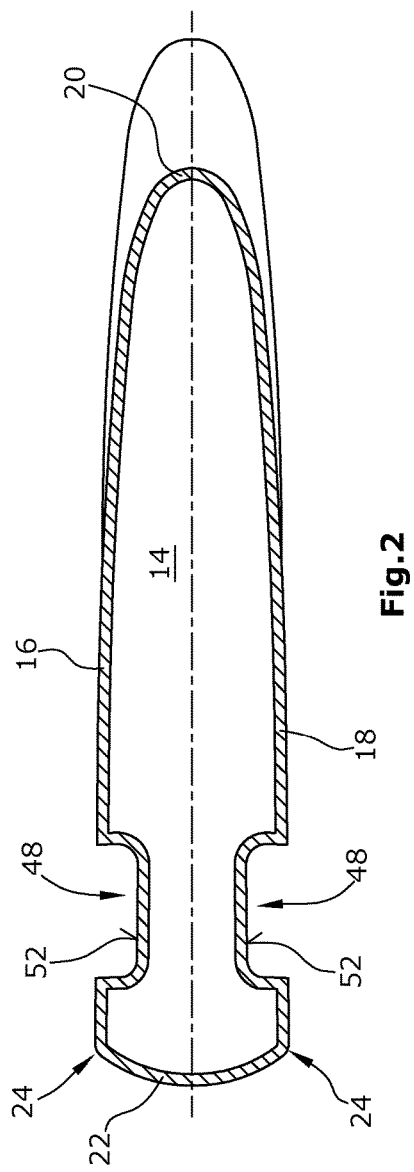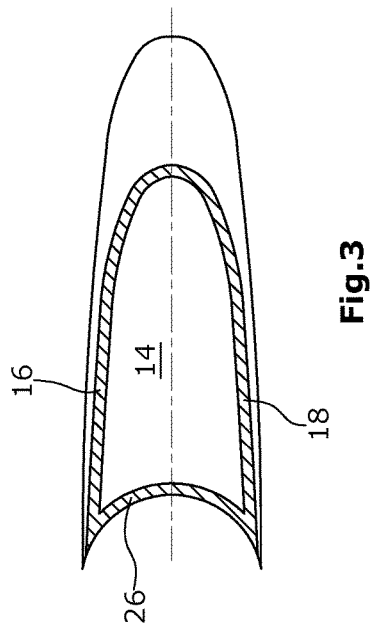

DRINKING BOTTLE FOR BICYCLES

CROSS-REFERENCE TO RELATED APPLICATION

This application claims priority to German Patent Application No. 20 2015 004 670.3 filed Jul. 2, 2015, the disclosures of which are hereby incorporated in their entirety by reference.

BACKGROUND OF THE INVENTION

Field of the Invention

The disclosure relates to a drinking bottle for bicycles, as well as to a bicycle steering structure system with a drinking bottle.

Description of Related Art

It is known in particular for time trial bicycles and triathlon bicycles to fasten a drinking bottle not on the down tube or the seat tube, but to integrate it into the steering structure. A triathlon steering structure with an integrated drinking bottle is known for example from FR 2 678 231. This steering structure is an integral steering structure with a cavity between the forearm supports, in which liquid may be arranged. An aerodynamically shaped bicycle steering structure for a time trial bicycle and a triathlon bicycle is further known from EP 1 894 824. Again, the drinking bottle is integrated into the steering structure.

Steering structures of time trial bicycles and triathlon bicycles are further connected with forearm supports and gripping elements. The additional gripping elements serve to grip the steering structure when the forearms rest on the forearm supports. Here, the forearm supports and possibly also the additional gripping elements are connected with the steering structure or the handlebar by means of a fixing element. In this case, the forearm support and possibly also the gripping elements are adjustable in height.

SUMMARY OF THE INVENTION

It is an object of the invention to provide a drinking bottle for bicycles that is shaped aerodynamically and is suited in particular for time trial bicycles. Further, it is an object to provide a corresponding bicycle steering structure system.

The object is achieved according to the invention with a drinking bottle for bicycles as defined in the present disclosure and a bicycle steering structure system as defined in the present disclosure.

The drinking bottle for bicycles of the present disclosure, which is suited in particular for time trial bicycles, as well as triathlon bicycles, includes a liquid container for holding liquids. The liquid container has two opposing side walls, a rear walls connecting the side walls, and a front wall connecting the side walls. Further, the liquid container is closed with a lid. Here, the lid may extend in particular over the entire upper side or only over a part of the upper side of the liquid container. Further, the liquid container is closed at its lower side by a bottom element. The bottom element is correspondingly connected with the side walls, the rear wall and the front wall. In particular, the liquid container is formed integrally, except for the lid.

According to the disclosure the two side walls each have a recess for receiving a respective fixing element. The fixing elements are the fixing or holding elements for the forearm supports and/or the additional gripping elements, each connected with the handlebar of a bicycle steering structure. By providing such recesses it is possible to arrange the fixing elements at least partly inside an outer contour of the drinking bottle. This offers substantial advantages with regard to aerodynamics, since the aerodynamics is no longer impaired by the fixing elements. Under aspects of aerodynamics, the three components, i.e. the two fixing elements and the drinking bottle, are combined into one component. This alone can significantly improve the aerodynamics.

Further, it has been found that, in case of a spaced arrangement, turbulences occur between a drinking bottle arranged on the bicycle steering structure between two such fixing elements and the fixing elements, the turbulences significantly impairing the aerodynamics.

In a preferred embodiment the two recesses are open to the outside. The recesses are in particular indentations in the side walls. In particular, this has the advantage that it is possible to simply attach the drinking bottle on the fixing elements from above. In this regard it is further preferred that the recesses are also open in the downward direction, i.e. in the region of the bottom element of the drinking bottle.

In a particularly preferred development of the disclosure holding elements are provided in the recesses for connection with the fixing elements. Such holding elements, which in particular are latching elements, serve to retain the drinking bottle on the fixing elements. In this regard, the fixing elements have holding elements, in particular latching elements, corresponding to the holding elements. In a particularly preferred embodiment the drinking bottle may thus be attached from above onto the fixing elements or between the two fixing elements, wherein a releasable connection between the holding elements in the recesses and the holding elements provided on the fixing elements is made. In this regard, the two recesses have a double function, since they may be designed, on the one hand, for an aerodynamic integration of the fixing elements and, on the other hand, for holding the drinking bottle.

The two recesses are preferably designed such that, in the mounted state of the drinking bottle, the two fixing elements are flush with the side walls or with the outer sides of the side walls. The occurrence of turbulences is thereby avoided so that a further improvement of the aerodynamics is achieved.

To improve the aerodynamics, the front wall of the drinking bottle is convex in shape. Further, it is preferred that the front wall smoothly merges with the two side walls of the drinking bottle so as to guarantee good aerodynamics.

In a preferred development of the disclosure the liquid container has an additional liquid container. The additional liquid container adjoins the liquid container in particular in the downward direction. In the mounted state it is preferred that the additional container is arranged in front of the steer tube of the bicycle frame. This has the significant advantage that the aerodynamics is not affected if an additional container for liquid is provided. The aerodynamics is not or only negligibly impaired, since air must flow past the steer tube anyway.

The additional bottle container arranged at the bottom side of the bottle container is connected with the same such that a common liquid receiving space is formed.

It is further preferred that the two liquid containers have a common, in particular stepless front wall and/or common, in particular stepless side walls. The rear wall of the liquid container is offset with respect to the rear wall of the additional liquid container. In this regard, the additional rear wall of the additional liquid container is offset frontward, seen in the traveling direction, i.e. towards the front wall. In particular it is possible that the additional liquid container is arranged in front of the steer tube and the liquid container is arranged above the front tube in the region of a handlebar stem.

The additional rear wall is preferably of a concavely curved design, wherein the curvature is adapted to the curvature of the steer tube.

For a further improvement of the aerodynamics it is preferred that the front wall of the bicycle drinking bottle is inclined in particular in the traveling direction, i.e. forward. In this regard, the front wall preferably extends substantially in parallel with the steer tube.

The disclosure further relates to a bicycle steering structure system which is suited in particular for time trial bicycles and triathlon bicycles. The bicycle steering structure system includes a handlebar. This is the preferably horizontal element of the steering structure, at the ends of which the handle elements are formed. Two fixing elements are connected at the centre of the handle bar, which serve to receive forearm supports and/or additional gripping elements. According to the disclosure the two fixing elements are arranged such that a bicycle drinking bottle may be arranged between them as described above, such that the two fixing elements are arranged at least in part in the two recesses provided in the side walls of the liquid container of the drinking bottle.

The bicycle steering structure system preferably includes a bicycle drinking bottle as described above in particular according to the preferred developments.

Further, the bicycle steering structure system is advantageously developed as described above with reference to the bicycle drinking bottle.

It is preferred that the fixing elements have receiving elements directed away from the drinking bottle, i.e. elements directed outward. These serve for connection with a respective forearm support and/or for connection with an additional gripping element. In particular, it is preferred that the fixing elements are adjustable in height so that the height of the forearm supports and/or the additional gripping elements is adjustable.

In the mounted state of the bicycle drinking bottle, the respective outer sides of the fixing elements preferably merge smoothly with the side walls or the outer sides of the side walls. With such an integration of the fixing elements into the aerodynamic outer contour of the bicycle drinking bottle, it is possible to achieve very good aerodynamics.

Since, in a preferred embodiment, the drinking bottle is independent of the fixing elements, it is possible to use the bicycle also without the drinking bottle. The drinking bottle itself is not a supporting component, especially not for the forearm supports. Further, the simple detachability of the bicycle drinking bottle has the advantage that the same can be cleaned or replaced in a simple manner. Further, different sizes of drinking bottles may be designed in a simple manner, so that, depending on the requirements, drinking bottles with different capacities may be used.

BRIEF DESCRIPTION OF THE DRAWINGS

The following is a detailed description of the disclosure with reference to a preferred embodiment and to the accompanying drawings.

In the Figures:

FIG. 2 is a schematic sectional view along line II-II in FIG. 1,

FIG. 3 is a schematic sectional view along line III-III in FIG. 1,

DETAILED DESCRIPTION OF THE INVENTION

Figure 1:
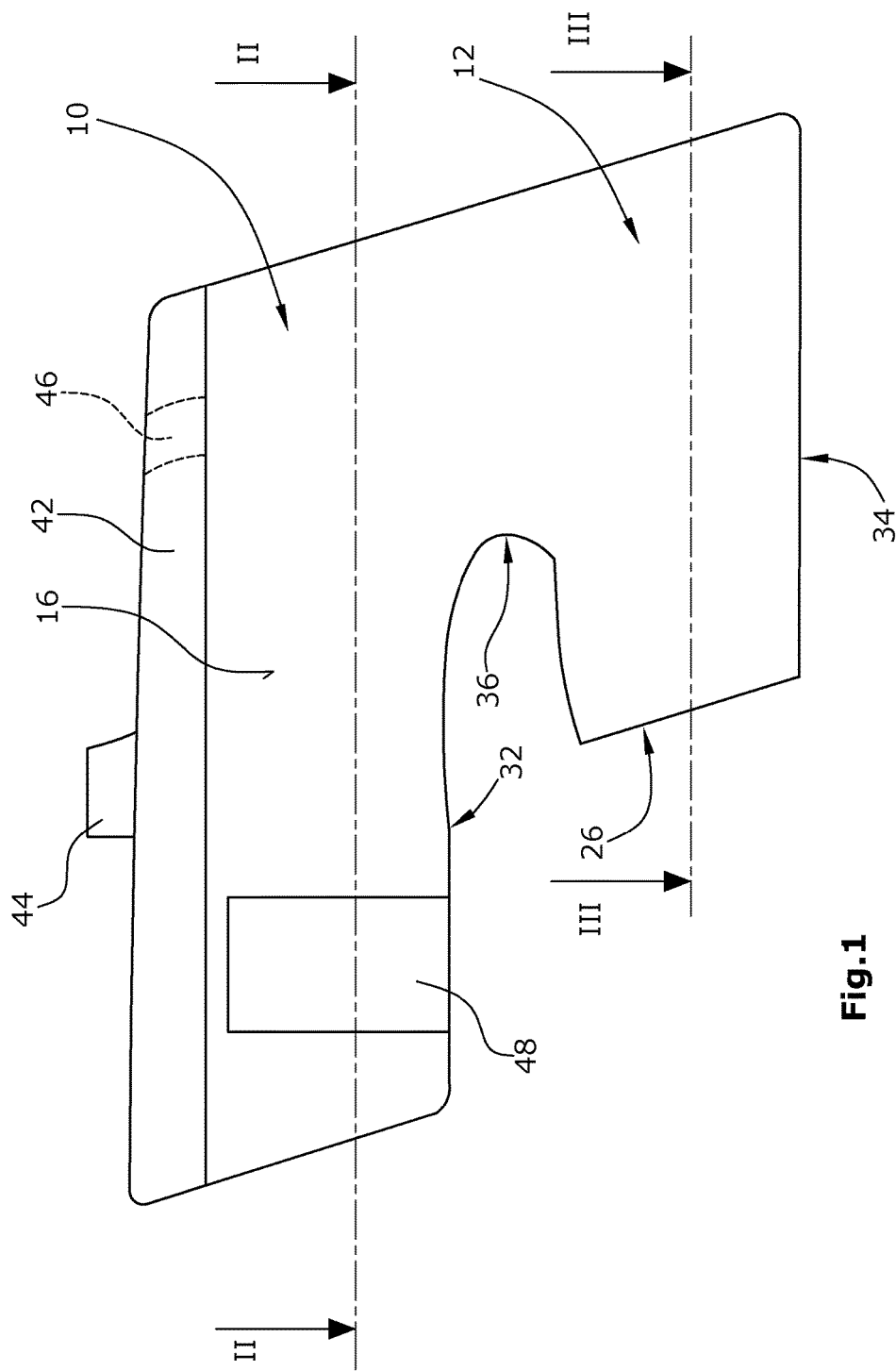
FIG. 1 is a schematic side view of a bicycle drinking bottle.

The bicycle drinking bottle includes a liquid container 10 as well as an additional liquid container 12, wherein both liquid containers 10, 12 form a common receiving space 14 (FIGS. 2 and 3) for liquid. In the embodiment illustrated the liquid containers together have opposite side walls 16, 18. In the mounted state of the bottle, the two side walls 16, 18 are connected with each other via a front wall 20 in the front region, seen in the traveling direction. Here, both side walls merge with the front wall in a stepless or continuous manner. Further, the upper liquid container 10 has a rear wall 22, wherein the side walls 16, 18 merge with the rear wall 22 in a stepless manner as well. In particular, the transition regions 24 are formed to be rounded.

Figure 4:
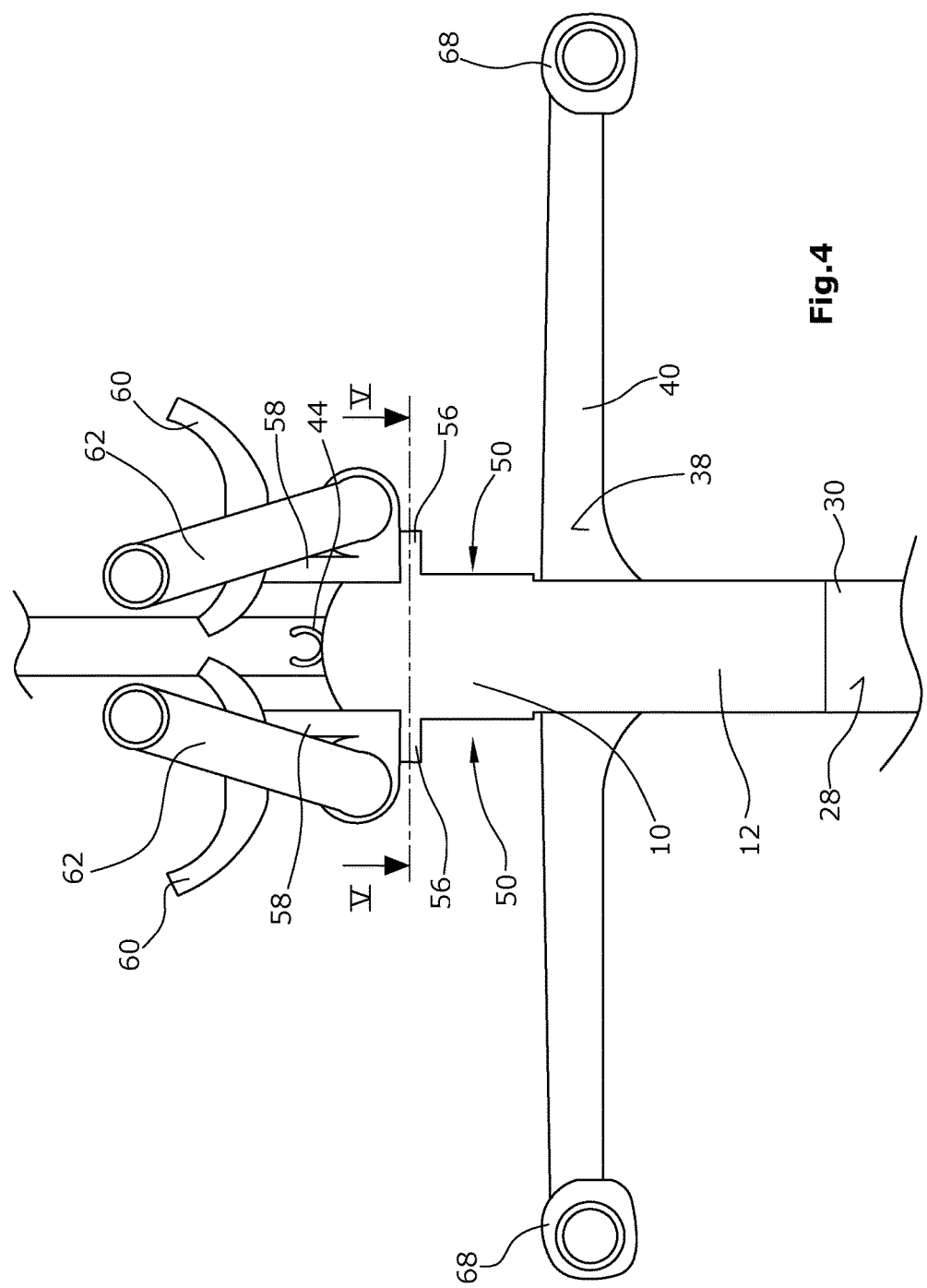
FIG. 4 is a schematic front view of a bicycle steering structure system.

The additional liquid container 12 also has a rear wall 26. The same is also connected with the side walls 16, 18, but without a continuous transition. Rather, the additional rear wall 26 is concavely shaped so that it abuts on an outer side 28 of a steer tube 30 (FIG. 4). Further, the two liquid containers each have a bottom element 32, 34. The bottom element 32 of the upper liquid container 10 is connected with the additional rear wall 26 via an intermediate wall 36 (FIG. 1). In the mounted state, an intermediate wall 36 rests on a front side 38 (FIG. 4) of a handlebar 40 and is therefore also concavely shaped. The two liquid containers 10, 12 forming a common receiving space are closed by a common lid 42. In the embodiment illustrated the same extends over the entire upper side of the upper liquid receiving container 10. The lid 42 is provided with a drinking straw fixing means 44. The lid 42 further has an opening for insertion of a drinking straw.

Figure 5:
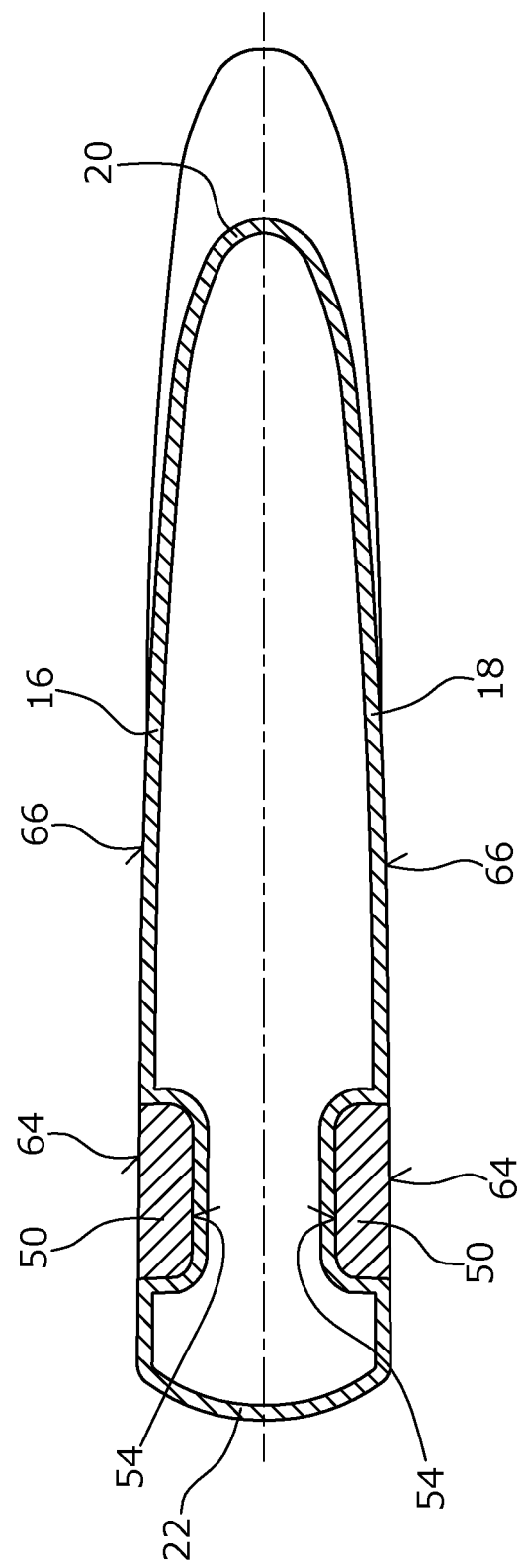
FIG. 5 is a schematic sectional view along line V-V in FIG. 4.

According to the disclosure the two side walls 16, 18 each have a recess 48. The two recesses 48 are arranged opposite each other. The two recesses 48 serve to receive fixing elements 50 (FIG. 5) connected with the handlebar 40. In a preferred embodiment the recesses 48 further have holding elements, such as latch elements, on an inner side 52. These holding elements, which are not illustrated herein, cooperate with holding elements that are respectively provided on an outer side 54 (FIG. 5) of the two fixing elements 50.

The fixing elements 50 are connected with the handlebar 40 (FIG. 4). This is done in the manner usual for such fixing elements. The fixing elements 50 are connected with receiving elements 56 (FIG. 4). The receiving elements 56 are directed away from the liquid container 10 or outward. The receiving elements serve for connection with possible separate further receiving elements 58 that carry forearm supports 60. The receiving elements 58 further serve for connection with additional gripping elements 62. The forearm supports 60 and the gripping elements 62 are components common with time trial bicycles or triathlon bicycles.

The dimensions of the recesses 48 (FIG. 2) are such with respect to the fixing elements 50 that an outer side 64 of the fixing elements 50 is free of steps with the side walls 16, 18 or the outer sides 66 of the side walls 16, 18. The transition between the outer sides 64 and 66 is smooth and stepless.

The handlebar 40 is connected with grip elements 68 (FIG. 4) at its outer ends.

Due to the aerodynamic design of the liquid containers 10, 12 and the integration of the fixing elements 50 in to the recesses 48 of the side walls 16, 18, a very aerodynamic bicycle steering structure system is formed.

The invention claimed is:

1. A bicycle drinking bottle comprising:
   a liquid container comprising:
      two opposite side walls,
      a rear wall connecting the side walls,
      a front wall connecting the side walls,
      a lid closing the drinking bottle, and
      a bottom element,
   wherein the liquid container is formed with a first liquid compartment and a second liquid compartment, in which a longitudinal length of the first liquid compartment is greater than a longitudinal length of the second liquid compartment,
   wherein the two side walls have recesses for receiving fixing elements connected with a handlebar of a bicycle steering structure and for integrating the fixing elements at least partly inside a contour of the liquid container, and
   wherein the fixing elements comprise fixing or holding elements for operatively connecting forearm supports, additional gripping elements, or forearm supports and additional gripping elements to the handlebar.

2. The bicycle drinking bottle of claim 1, wherein the recesses are open to the outside.

3. The bicycle drinking bottle of claim 1, wherein the recesses are open in the downward direction.

4. The bicycle drinking bottle of claim 1, wherein holding elements are provided in the recesses for connection with the fixing elements.

5. The bicycle drinking bottle of claim 1, wherein the front wall is convex in shape and merges with the side walls in a stepless manner.

6. The bicycle drinking bottle of claim 1, wherein the liquid container is connected with an additional liquid container.

7. The bicycle drinking bottle of claim 6, wherein the additional liquid container is connected with a bottom side of the liquid container, wherein the two liquid containers form a common liquid receiving space.

8. The bicycle drinking bottle of claim 6, wherein the additional liquid container and the liquid container have a common, stepless front wall and/or common, stepless side walls.

9. The bicycle drinking bottle of claim 6, wherein the additional liquid container comprises an additional rear wall offset towards the front wall with respect to the rear wall of the liquid container.

10. The bicycle drinking bottle of claim 9, wherein the additional rear wall is con-cavely curved.

11. The bicycle drinking bottle of claim 1, wherein in a mounted state, the front wall is inclined to the front.

12. A bicycle steering structure system comprising:
    a handlebar,
    two fixing elements connected with the handlebar, the fixing elements comprising fixing or holding elements connected to forearm supports, additional gripping elements, or forearm supports and additional gripping elements to the handlebar, and
    a bicycle drinking bottle comprising:
       a liquid container comprising:
          two opposite side walls,
          a rear wall connecting the side walls,
          a front wall connecting the side walls,
          a lid closing the drinking bottle, and
          a bottom element,
       wherein the two side walls have recesses that receive the fixing elements connected with the handlebar and that integrate the fixing elements at least partly inside a contour of the bicycle drinking bottle.

13. The bicycle steering structure system of claim 12, wherein the fixing elements have receiving elements directed away from the drinking bottle.

14. The bicycle steering structure system of claim 12, wherein an outer side of the fixing elements merges steplessly with the side walls.

15. A bicycle drinking bottle comprising:
    a liquid container comprising:
       two opposite side walls,
       a rear wall connecting the side walls,
       a front wall connecting the side walls,
       a lid closing the drinking bottle, and
       a bottom element,
    wherein the liquid container is formed with a first liquid compartment and a second liquid compartment, in which a recess is defined in a front portion of the liquid container to separate a portion of the first liquid compartment from a portion of the second liquid compartment,
    wherein the two side walls have recesses for receiving fixing elements connected with a handlebar of a bicycle steering structure and for integrating the fixing elements at least partly inside a contour of the liquid container, and
    wherein the fixing elements comprise fixing or holding elements for operatively connecting forearm supports, additional gripping elements, or forearm supports and additional gripping elements to the handlebar.

* * * * *